United States Patent [19]

Woodhams

[11] Patent Number: 4,978,698

[45] Date of Patent: Dec. 18, 1990

[54] BITUMEN-POLYOLEFIN COMPOSITIONS

[75] Inventor: Raymond T. Woodhams, Toronto, Canada

[73] Assignee: The University of Toronto Innovations Foundation, Toronto, Canada

[21] Appl. No.: 269,604

[22] Filed: Nov. 10, 1988

Related U.S. Application Data

[63] Continuation-in-part of Ser. No. 21,844, Mar. 4, 1987, abandoned.

[30] Foreign Application Priority Data

Mar. 4, 1986 [CA] Canada ................................... 503241

[51] Int. Cl.$^5$ ........................ C08L 95/00; C08L 91/06
[52] U.S. Cl. ......................................... 524/62; 524/59; 524/68; 524/69; 524/70; 524/71
[58] Field of Search ....................... 524/59, 62, 68, 69, 524/70, 71

[56] References Cited

U.S. PATENT DOCUMENTS

| | | | |
|---|---|---|---|
| 3,853,800 | 12/1974 | Haberl | ................................... 524/59 |
| 3,896,069 | 7/1975 | Kosaka et al. | . |
| 4,248,749 | 2/1981 | Hayashi et al. | ........................ 524/71 |
| 4,738,998 | 4/1988 | Uffner et al. | ........................ 524/69 |

FOREIGN PATENT DOCUMENTS 0037136 10/1981 European Pat. Off. .

*Primary Examiner*—Lewis T. Jacobs
*Assistant Examiner*—David W. Woodward
*Attorney, Agent, or Firm*—Fleit, Jacobson, Cohn, Price, Holman & Stern

[57] ABSTRACT

Bitumen-polyolefin compositions, e.g. for use as binders in paving compositions, are stabilized by an emulsifier system comprising a polyethylene wax terminally functionalized with acidic groups and having a polymeric main chain structure which is compatible with the polyolefin of the dispersed phase of the binder. In a preferred embodiment, the emulsifier system also includes an inorganic metal compound which will react chemically with the terminal functional groups of the polyethylene wax. Especially preferred is maleated polyethylene wax (as the polyethylene wax) and ferric oxide (as the inorganic metal compound). The emulsifier system forms a sheath of inorganic material around the dispersed polyolefin droplets, to stabilize them and to hinder their floatation to the surface of the binder composition.

15 Claims, No Drawings

BITUMEN-POLYOLEFIN COMPOSITIONS

This application is a continuation-in-part of U.S. Ser. No 021,844 filed Mar. 4, 1987, now abandoned.

FIELD OF THE INVENTION

This invention relates to bitumen compositions and methods for their preparation. More specifically, it relates to compositions of bitumen and polyolefins, e.g. polyethylene or polypropylene, useful in adhesives, caulkings, sealants and the like, and as binders for mixing with inorganic aggregates such as stone, sand etc. to form paving and other road construction materials.

BRIEF DESCRIPTION OF THE PRIOR ART

It is known in the prior art that polymeric materials may be dispersed in bitumen to form useful mixtures. Numerous examples may be found in the literature pertaining to the modification of bitumen with elastomers, block copolymers, polyolefins, vinyl polymers and the like. More recently it has been found that mixtures of polyethylene and bitumen possess qualities which are particularly suitable for use in paving mixtures. The polyethylene is reported to counteract the tendency of the bitumen to soften at elevated temperatures and to become brittle at low temperatures. Such compositions are described in U.S. Pat. No. 4,314,921 Biegenzein and Canadian patent No. 1,066,831 Hemeran, for example.

Polyethylene-bitumen mixtures typically are of the nature of emulsions, with the bitumen forming the continuous phase and the polyethylene forming the dispersed phase. The polyethylene (or other similar polyolefin) is substantially insoluble in the bitumen, so that a two phase system can form. While these liquid polyethylene-bitumen mixtures remain relatively stable for short periods of time (i.e. hours), over longer period of time (i.e. days) and at higher temperatures (e.g. 140° C.), the mixtures are deficient in that the low density polyethylene particles will slowly coalesce and rise to the surface of the bitumen where the droplets congeal into a thick, viscous layer which is very difficult to re-disperse into the bitumen phase. This tendency of the polyethylene to separate from emulsion and rise to the surface of the mixture has been found to be undesirable in normal paving practice since it complicates storage, handling and use of the polyethylene-modified bitumen.

Moreover, on preparing such compositions, there is a large increase in viscosity of the mixture after addition of minor quantities of polyethylene. As a result, the mixing times required for mixing the aggregate into the mixture in the hot mix paving process (usually in a pug mill) are lengthened, thus tending to increase the mixing power requirements and costs, and reduce the economic benefits.

Thus, it would be desirable to have polyolefin-modified bitumens which remain stable for long periods of time in the heated molten stage, preferably without agitation.

SUMMARY OF THE INVENTION

It is an object of the present invention to provide novel bitumen-polyolefin compositions which overcome or at least reduce one or more of these disadvantages.

Accordingly, in one of its aspects, the present invention provides a bitumen-polyolefin composition suitable for mixing with aggregates to provide paving compositions, the bitumen-polyolefin composition comprising a continuous bitumen phase and a dispersed polyolefin phase, the polyolefin phase being present therein as discrete regions stabilized with an emulsifier system comprising a polyethylene wax terminally functionalized with acidic groups, the polyethylene wax having main polymeric chains compatible with the dispersed polyolefin phase;

wherein the polyolefin is present in an amount of from about 2% to about 20% by weight of the composition and the polyethylene wax is present in an amount of from about 0.1% to about 5% by weight of the composition.

In another of its aspects, the present invention provides a bitumen-polyolefin composition suitable for mixing with aggregates to provide paving compositions, the bitumen-polyolefin composition comprising a continuous bitumen phase and a dispersed polyolefin phase, the polyolefin phase being present therein as discrete regions stabilized with an emulsifier system comprising (i) a polyethylene wax terminally functionalized with acidic groups, the polyethylene wax having main polymeric chains compatible with the dispersed polyolefin phase, and (ii) at least one inorganic metal compound in chemical association with the acidic groups of the polyethylene wax;

wherein the polyolefin is present in the amount of from about 2% to about 20% by weight of the composition and the polyethylene wax is present in the amount of from about 0.1% to about 5% by weight of the composition.

In yet another of its aspects, the present invention provides a bitumen composition comprising a bituminous binder and inorganic aggregates, the bituminous binder comprising a continuous bitumen phase and a dispersed polyolefin phase, wherein the bituminous binder comprises an emulsifier system comprising a polyethylene wax terminally functionalized with acidic groups, the polyethylene wax having main polymeric chains compatible with the dispersed polyolefin phase.

In yet another of its aspects, the present invention provides a bitumen composition comprising a bituminous binder and inorganic aggregates, the bituminous binder comprising a continuous bitumen phase and a dispersed polyolefin phase, wherein the bituminous binder comprises an emulsifier system comprising (i) a polyethylene wax terminally functionalized with acidic groups, the polyethylene wax having main polymeric chains compatible with the dispersed polyolefin phase, and (ii) at least one inorganic metal compound in chemical association with the acidic groups of the polyethylene wax.

In yet another of its aspects, the present invention provides a process for producing bitumen-polyolefin compositions having a continuous bitumen phase and a dispersed polyolefin phase, which comprises mixing bitumen and a polyolefin in the presence of an emulsifier system comprising a polyethylene wax terminally functionalized with acidic groups, the polyethylene wax having main polymeric chains compatible with the dispersed polyolefin phase.

In yet another of its aspects, the present invention provides a process for producing bitumen-polyolefin compositions having a continuous bitumen phase and a dispersed polyolefin phase, which comprises mixing bitumen and a polyolefin in the presence of an emulsifier system comprising (i) a polyethylene wax terminally functionalized with acidic groups, the polyethylene wax having main polymeric chains compatible with the dispersed polyolefin phase and (ii) at least one inorganic metal compound in chemical association with the acidic groups of the polyethylene wax.

DETAILED DESCRIPTION OF THE INVENTION

Thus, the bitumen-polyolefin compositions of the present invention contain an emulsifying system for the polyolefin therein, which has the effect of stabilizing the dispersion of polyolefin in the mixture and counteracting the tendency of phase separation to occur. The emulsifying system comprises a polyethylene wax which: (i) is terminally functionalized with acidic groups, and (ii) has a polymeric chain structure compatible with the polyolefin dispersed in the mixture. In an aspect of the invention, the emulsifying system further comprises at least one inorganic metal compound in chemical association with the acidic groups of the polyethylene wax.

The components of the emulsifying system associate together and with the polyolefin in the bitumen-polyolefin mixture to create a stable dispersion containing discrete polyolefin particles therein. Not only does the emulsifying system stabilize the dispersion, but also the polyethylene wax additionally serves to reduce the viscosity of the mixture, hence reducing the mixing power requirements and rendering high mixing temperatures unnecessary. The resulting compositions are particularly suitable for use as binders, to be mixed with aggregates to form road construction materials.

Whilst it is not intended that the invention should be limited to any particular theory or mode of action of the emulsifying system, it is believed that the polyethylene wax polymer chains associate with the polymer chains of the polyolefin of the mixture, with the hydrocarbon-incompatible polar headgroups of the polyethylene wax protruding outwardly from the polymer particles. In the absence of inorganic metal compounds, the polar groups form a protecting sheath around the polyolefin dispersed phase and subsequently react with added aggregates to stabilize the mixture. When an inorganic metal compound is included as a part of the emulsifier system, the inorganic metal compound reacts with or otherwise chemically associates with the polar headgroups of the polyethylene wax, so as effectively to encase the emulsified polyolefin particles in a sheath of inorganic material. Thus, whether or not an inorganic metal compound is used in the emulsifying system, reagglomeration of the polyolefin dispersion is effectively prevented or at least substantially hindered, and the density of the dispersed polyolefin particles in the bitumen is increased, so that they remain in suspension and do not rise to the surface.

The essential characteristics of the polyethylene wax are a main polymeric backbone chain exhibiting a high degree of compatibility with the dispersed phase polyolefin, and a functional acidic group on at least one end of the polyethylene chain. It will thus be understood that the polyethylene wax of the emulsifier system should be partially soluble in the polyolefin phase of the binder such that the end polar substituent of the polyethylene wax confers sufficient surface activity to cause the emulsifier system to accumulate preferentially at the interface between the emulsified particles and the suspending bitumen phase.

The choice of polyolefin suitable for use in all aspects of the present invention is not particularly restricted. Preferably, the polyolefin is derived from about 90 to 100 mole percent of ethylene and from 0 to about 10 mole percent of an alkene. Examples of suitable alkenes include hexene-1, butene-1, octene-1 and propylene. The more preferred polyolefin suitable for use in all aspect of the present invention is polyethylene.

Preferably, the polyethylene wax of the emulsifier system has a molecular weight of from about 200 to about 10,000. Materials of such molecular weights show a higher and more desirable degree of compatibility with the dispersed phase polyolefins of the binder.

According to a preferred embodiment of the present invention, the polyethylene wax of the emulsifier system has at least one carboxylic acid terminal group. Typically this carboxylic acid group will be at a chain end of the polyethylene wax. A more preferred polyethylene wax suitable for use in all aspects of the present invention is maleated polyethylene.

The most preferred polyethylene wax suitable for use in all aspects of the present invention is maleated polyethylene having a molecular weight of from about 1000 to about 10,000. Maleated polyethylene waxes of such molecular weights are known and are commercially available, e.g. under the trade mark EPOLENE (from Eastman Chemical Products Inc.), and under the trade name REXPOLE from Nippon Petrochemicals Company.

As described hereinabove, an aspect of the present invention relates to the use of an emulsifier system which comprises (i) a polyethylene wax terminally functionalized with at least one acidic group, and (ii) at least one inorganic metal compound in chemical association with the acidic groups of the polyethylene wax. It has been discovered that neutral buoyancy of the suspended polyolefin particles may be achieved by incorporating within each polyolefin particle an amount of smaller particles of inorganic metal compounds, such that the average density of the composite droplet is substantially the same as that of the surrounding bitumen continuous phase. This similarity in density between the polyolefin (particle) dispersed phase and the surrounding bitumen continuous phase is believed to be responsible for the improved stability characteristics of these compositions.

Thus, the polar acidic groups of the polyethylene wax are accessible for reaction with the relatively basic inorganic metal compounds. It is not essential that the inorganic particles react to form carboxylates or salts. It is believed that the emulsifying polyethylene wax, which is surface active, promotes the formation of an inorganic sheath surrounding each polyolefin particle, thereby preventing coalescence.

Thus, by achieving a polyolefin dispersed phase of density similar to that of the bitumen continuous phase and by preventing coalescence as hereinbefore described, the occurrence of phase separation at high temperatures may be substantially reduced.

The inorganic metal compounds suitable for use in the present invention may be selected from the group including oxides, hydroxides, carbonates, sulphates or silicates of inorganic metals such as magnesium, calcium, barium, iron, zinc, aluminum, silica, tin, lead, antimony, titanium or zirconium. Certain metal oxides, hydroxides, carbonates or silicates that catalyze oxidation of the bitumen should be excluded. In addition to the above metal salts, one may use fly ash and mixed oxides or mixed silicates as may be obtained by fine grinding of naturally occurring minerals. It will be apparent that the fine ground mineral component should be considerably smaller than the emulsified particles in order to form an adhering sheath at the interface. Thus, the metal compound is preferably added at colloidal size ranges, e.g. 25 microns. Metal salts will evolve spontaneously from reactive metal oxides and concentrate at the polyolefin-bitumen interface. In an alternative procedure, the metal carboxylate derivatives of the polyolefin wax emulsifying agent may be employed directly, instead of creating the salt in situ.

A preferred group of inorganic compounds are the basic metal oxides, more preferably ferric oxide, calcium oxide and magnesium oxide. Particularly preferred is ferric oxide. It has been found that ferric oxide confers on the system a high degree of moisture resistance, probably as a result of its ability to promote a high degree of adhesion between the bitumen of the binder and the subsequently added aggregate. In any event, ferric oxide appears to be unique in its ability to prevent moisture from destroying the bond between the bitumen and the aggregate.

The relative proportions of bitumen, polyolefin, emulsifying agent and metal compound (including oxides, hydroxides, silicates and carboxylates) may be varied through ratios according to the desired level of performance. For most purposes, the weight percentage of polyolefin should be from about 2 to about 20%, preferably from about 3 to about 8%; the polyolefin wax of the emulsifier system should be present in amounts of from about 0.1 to about 5%, preferably from about 0.1 to about 1%; and the inorganic metal compound should be present in amounts of from about 1 to 10% based on the total weight of binder. The exact concentration of each reagent depends upon several factors in addition to the stability such as the viscosity, low temperature performance and Marshall test values. The final concentration of polyolefin is preferably from about 5% to about 10% by weight of the composition. The more preferred polyolefin for use in all aspects of the present invention is polyethylene. Thus, the present invention may be used advantageously to consume large amounts of scrap polyethylene a relatively stable polymer which is creating an increasing waste disposal problem. Alternatively, virgin polyethylene is suitable for use in all aspects of the present invention.

As used herein, the term bitumen refers to viscous aromatic residues from petroleum sources (pitches), and naturally occurring bitumens such as asphaltites, e.g. Gilsonite.

To prepare the compositions of the present invention, techniques normally employed for preparing bitumen-polyolefin compositions may be employed.

The ingredients may be mixed in any particular sequence using a high speed stirrer with shearing ring, sigma blade mixer or mixing extruder. In the preferred method the bitumen and other ingredients are mixed together in a Brabender mixing head with counter rotating sigma blades. The concentration of the polyolefin is suitably initially near 50% by weight so that a concentrated dispersion of polyolefin in bitumen is produced after several minutes of mixing near 120° C. The hot viscous mixture may be cooled and pelletized until ready for use. This pelletized concentrate may be further diluted in heated bitumen with an ordinary stirrer to form a smooth, stable emulsion of desired concentration. The pellets are readily stored in bags or containers since they are quite stable and do not adhere to each other, maintaining a free flowing nature as in the case of pelletized plastics materials. If preferred, the pellet concentrate may be added directly to the pug mill without intermediate dilution. In the pug mill, the concentrate is mixed with reinforcing aggregates and additional quantities of bitumen, ready for application to a surface.

Alternatively, the polyolefin may be dispersed in bitumen using a high speed shearing impeller of the silverson type. Under these conditions, the maximum concentration that can be easily controlled is approximately 10% by weight polyolefin.

The polyolefin wax of the emulsifier system used in the compositions of this invention reduces the viscosity of the mixture dramatically, so that larger concentrations of the polyethylene may be incorporated into the bitumen without adversely affecting the speed of mixing with aggregate in the pug mill. The process is applicable to all grades of bitumen, the grade of bitumen being selected according to end use e.g. paving requirements.

While this invention discloses an improved method of dispersing polyethylenes in bitumen for paving applications, it will also be apparent that these mixtures will have utility in adhesive mixtures, caulks and sealants, potting resins, crack fillers, pot-hole fillers, mortars, coatings, weatherproofing fabrics and papers, roofing shingles and molded goods. The invention is further illustrated in the following non-limiting specific examples.

EXAMPLE 1

Linear low density polyethylene (22.5 Exxon ESCORENE, Melt Index 50 g/10 min.) was mixed with bitumen (22.5 g Gulf Clarkson 85/100 Pen.), maleated polyethylene wax (3 g Nippon Petrochemical Rexpole wax) and ferric oxide (2 g Fisher Scientific reagent grade) in a Brabender Mixing Head (50 ml capacity) at 120° C. and 40 rpm for 5 minutes. The hot mixture was poured onto an aluminum plate and allowed to cool to room temperature. The resulting sheet of bitumen containing dispersed polyethylene could be cut into small non-tacky pieces with scissors and stored for future use. Portions of the concentrate were further diluted in heated bitumen (at 140° C.) to concentrations of 6, 8, 10 and 12 percent polyethylene (by weight) using a standard laboratory stirrer. The suspensions were then placed in an air oven at 145±5° C. for at least six hours without agitation. After this period of time the liquid mixtures were removed from the oven and checked for signs of separation. In these examples the dispersions remained stable with no evident sign of separation. The dispersions remained smooth and glossy without the formation of a surface layer of polyethylene. Similar mixtures without added stabilizers tended to separate rapidly at temperatures above 140° C. into a surface layer of polyethylene which was extremely viscous and impossible to redisperse.

EXAMPLE 2

Linear low density polyethylene (22 g Exxon Escorene, Melt Flow Index 50 g/min.) was mixed with 22 g bitumen (Gulf Clarkson 80/100 Pen.), 3.5 g maleated polyethylene wax (Nippon Petrochemical Rexpole wax sample, molecular weight 3800 g/mol) and 2.5 g calcium hydroxide (Fisher Scientific reagent grade) at 160° C. in a Brabender Mixing Head equipped with roller blades. After 5 minutes mixing at 100 rpm the Liquid contents were poured onto an aluminum plate and the cooled sheet cut into small pieces for further use. Portions of the concentrate were then diluted in additional bitumen at 140° C. using a simple low speed laboratory stirrer to 8 percent polyethylene (by weight). The diluted mixture was then placed in an air oven and allowed to stand for 6 hours at 145±5° C. in order to test the stability of the mixture with respect to separation of the polyethylene. Some slight segregation was observed after 6 hours but the particles were easily redispersed by gentle agitation to form a smooth, uniform mixture again. The viscosity of the mixture appeared to be greater than that of the ferric oxide system but considerably less than that of the unstabilized mixture.

I claim:

1. A bitumen-polyolefin composition suitable for mixing with aggregates to provide paving compositions, the bitumen-polyolefin composition comprising a continuous bitumen phase and a dispersed polyolefin phase, said polyolefin phase being present therein as discrete regions stabilized with an emulsifier system comprising a polyethylene wax terminally functionalized with acidic groups, said polyolefin wax having a molecular weight of from about 1,000 to about 10,000 and having main polymeric chains compatible with said dispersed polyolefin phase;

wherein said polyolefin is present in an amount of from about 2% to about 20% by weight of the composition and said polyethylene wax is present in an amount of from about 0.1% to about 5% by weight of the composition.

2. The composition of claim 1, wherein said polyolefin is present in an amount of from about 3% to about 8% by weight of the composition and said polyolefin wax is present in an amount of from about 0.1% to about 1% by weight of the composition.

3. The composition of claim 1, wherein said polyethylene wax is terminally functionalized with carboxylic acid groups.

4. The composition of claim 1, wherein said polyethylene wax is maleated polyethylene wax.

5. The composition of claim 1, wherein said dispersed polyolefin phase comprises a polyolefin derived from about 90 to about 100 mole percent of ethylene and from 0 to about 10 mole percent of an alkene selected from the group consisting of hexene-1, butene-1, octene-1 and propylene.

6. The composition of claim 1, wherein said dispersed polyolefin phase comprises polyethylene.

7. A bitumen composition comprising a bituminous binder and inorganic aggregates, the bituminous binder comprising a continuous bitumen phase and a dispersed polyolefin phase, wherein said bituminous binder comprises an emulsifier system comprising a polyethylene wax terminally functionalized with acidic groups, said polyethylene wax having a molecular weight of from about 1,000 to about 10,000 and having main polymeric chains compatible with said dispersed polyolefin phase.

8. The composition of claim 7, wherein said polyolefin is present in an amount of from about 2% to about 20% by weight of the bituminous binder and said polyethylene wax is present in an amount of from about 0.1% to about 5% by weight of the bituminous binder.

9. The composition of claim 7, wherein said polyolefin is present in an amount of from about 3% to about 8% by weight of the bituminous binder and said polyethylene wax is present in an amount of from about 0.1% to about 1% by weight of the bituminous binder.

10. The composition of claim 7, wherein said polyethylene wax is terminally functionalized with carboxylic acid groups.

11. The composition of claim 7, wherein said polyethylene wax is maleated polyethylene wax.

12. The composition of claim 7, wherein said dispersed polyolefin phase comprises a polyolefin derived from about 90 to about 100 mole percent of ethylene and from 0 to about 10 mole percent of an alkene selected from the group consisting of hexene-1, butene-1, octene-1 and propylene.

13. The composition of claim 7, wherein said dispersed polyolefin phase comprises polyethylene.

14. A bitumen-polyolefin composition suitable for mixing with aggregates to provide paving compositions, the bitumen-polyolefin composition comprising a continuous bitumen phase and a dispersed polyolefin phase, said polyolefin phase being present therein as discrete regions stabilized with an emulsifier system comprising a polyethylene wax terminally functionalized with acidic groups, said polyolefin wax having a molecular weight of from about 1000 to about 10,00 and having main polymeric chains compatible with said dispersed polyolefin phase;

wherein (i) said polyolefin is present in an amount of from about 2% to about 20% by weight of the composition and said polyethylene wax is present in an amount of from about 0.1% to about 5% by weight of the composition, and (ii) said dispersed polyolefin phase consists essentially of a polyolefin derived from about 90 to 100 mole percent of ethylene and from 0 to about 10 mole percent of an alkene selected from the group consisting essentially of hexene-1, butene-1, octene-1 and propylene.

15. A bitumen composition comprising a bituminous binder and inorganic aggregates, the bituminous binder comprising a continuous phase and a dispersed phase, wherein (i) said bituminous binder comprises an emulsifier system comprising a polyethylene wax terminally functionalized with acidic groups, said polyethylene wax having a molecular weight of from about 1000 to about 10,000 and having main polymeric chains compatible with said dispersed polyolefin phase, and (ii) said dispersed polyolefin phase consists essentially of a polyolefin derived from about 90 to 100 mole percent of ethylene and from 0 to about 10 mole percent of an alkene selected from the group consisting essentially of hexene-1, butene-1, octene-1 and propylene.

* * * * *